US010970195B2

(12) United States Patent
Hicks et al.

(10) Patent No.: US 10,970,195 B2
(45) Date of Patent: Apr. 6, 2021

(54) REDUCTION OF TEST INFRASTRUCTURE

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Thomas Rawlins, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/440,781

(22) Filed: Jun. 13, 2019

(65) Prior Publication Data

US 2020/0394126 A1    Dec. 17, 2020

(51) Int. Cl.
*G06F 9/44*     (2018.01)
*G06F 11/36*    (2006.01)
*G06F 16/9035*  (2019.01)

(52) U.S. Cl.
CPC ...... *G06F 11/3676* (2013.01); *G06F 11/3688* (2013.01); *G06F 16/9035* (2019.01)

(58) Field of Classification Search
CPC ............. G06F 11/3676; G06F 11/3688; G06F 16/9035
USPC .................................................. 717/124–135
See application file for complete search history.

(56) References Cited

U.S. PATENT DOCUMENTS

| 5,153,881 A | 10/1992 | Bruckert |
| 5,185,877 A | 2/1993 | Bissett |
| 5,410,634 A * | 4/1995 | Li ..................... G06N 20/00 706/62 |

(Continued)

FOREIGN PATENT DOCUMENTS

| WO | 2016138953 A1 | 9/2016 |
| WO | 2018162048 A1 | 9/2018 |

OTHER PUBLICATIONS

Yan et al, "Regression From Uncertain Labels and Its Applications to Soft Biometrics", IEEE, pp. 698-708 (Year: 2008).*

(Continued)

*Primary Examiner* — Anil Khatri
(74) *Attorney, Agent, or Firm* — Cantor Colburn LLP; Teddi Maranzano

(57) ABSTRACT

A method for reducing test case infrastructure includes generating a first plurality of fingerprints for a first plurality of test cases. Each of the first plurality of fingerprints is associated with one of the first plurality of test cases. Each of the first plurality of fingerprints uniquely identifies a specific code path covered by a corresponding test case. A second plurality of test cases is generated based on a functional coverage model of the SUT. A second plurality of fingerprints is generated for the second plurality of test cases. Each of the second plurality of fingerprints is associated with one of the second plurality of test cases. The first plurality of fingerprints is compared to the second plurality of fingerprints to identify one or more matching fingerprints. One or more test cases is identified within the first plurality of test cases associated with the one or more matching fingerprints.

17 Claims, 4 Drawing Sheets

(56) References Cited

U.S. PATENT DOCUMENTS

| | | | |
|---|---|---|---|
| 6,182,245 B1* | 1/2001 | Akin | G06F 11/3672 |
| | | | 711/100 |
| 6,182,258 B1* | 1/2001 | Hollander | G06F 30/33 |
| | | | 714/739 |
| 6,907,546 B1* | 6/2005 | Haswell | G06F 11/3684 |
| | | | 714/38.11 |
| 7,093,238 B2 | 8/2006 | Givoni | |
| 7,178,063 B1 | 2/2007 | Smith | |
| 7,235,358 B2* | 6/2007 | Wohlgemuth | C12Q 1/6881 |
| | | | 435/6.1 |
| 7,315,634 B2* | 1/2008 | Martin | G06K 9/00093 |
| | | | 382/124 |
| 7,552,425 B2 | 6/2009 | Bates et al. | |
| 7,617,074 B2 | 11/2009 | Beish | |
| 7,640,470 B2* | 12/2009 | Lammel | G06F 11/3676 |
| | | | 704/4 |
| 7,640,740 B2 | 1/2010 | Lammel | |
| 7,721,265 B1* | 5/2010 | Xu | G06F 9/45512 |
| | | | 717/127 |
| 7,752,502 B2* | 7/2010 | Clee | G06F 11/3688 |
| | | | 714/38.14 |
| 7,945,898 B1 | 5/2011 | Episkopos et al. | |
| 7,962,798 B2 | 6/2011 | Locasto | |
| 8,056,060 B2* | 11/2011 | Bicheno | G06F 11/3688 |
| | | | 717/127 |
| 8,234,105 B1* | 7/2012 | Aldrich | G06F 11/3676 |
| | | | 703/22 |
| 8,296,605 B2 | 10/2012 | John | |
| 8,301,757 B2* | 10/2012 | Catlin | H04M 3/4938 |
| | | | 709/224 |
| 8,370,816 B2 | 2/2013 | Farchi et al. | |
| 8,479,171 B2 | 7/2013 | Ghosh | |
| 8,527,813 B2 | 9/2013 | Budnik | |
| 8,554,811 B2 | 10/2013 | Mariani | |
| 8,649,995 B2 | 2/2014 | Thulasidasan et al. | |
| 8,756,460 B2* | 6/2014 | Blue | G06F 11/3676 |
| | | | 714/38.1 |
| 8,775,886 B2 | 7/2014 | Mellen | |
| 8,874,477 B2* | 10/2014 | Hoffberg | G06Q 10/103 |
| | | | 705/37 |
| 8,954,926 B2 | 2/2015 | Braun et al. | |
| 8,954,930 B2 | 2/2015 | Kamenz | |
| 8,997,061 B1 | 3/2015 | Davison | |
| 9,063,899 B2 | 6/2015 | Epstein | |
| 9,098,635 B2 | 8/2015 | Peri-Glass et al. | |
| 9,111,033 B2 | 8/2015 | Bates | |
| 9,141,520 B2* | 9/2015 | Zheng | G06F 11/3688 |
| 9,202,005 B2 | 12/2015 | Goswami et al. | |
| 9,286,313 B1 | 3/2016 | Sharangpani | |
| 9,336,122 B2 | 5/2016 | Kilzer et al. | |
| 9,454,466 B2 | 9/2016 | Ivrii et al. | |
| 9,489,289 B2 | 11/2016 | Hu | |
| 9,513,998 B2 | 12/2016 | Coronado | |
| 9,529,701 B2 | 12/2016 | Ekambaram et al. | |
| 9,600,403 B1* | 3/2017 | Raz | G06F 11/3684 |
| 9,626,277 B2 | 4/2017 | Thangamani | |
| 9,720,766 B2 | 8/2017 | Lee | |
| 9,734,263 B2 | 8/2017 | Kohavi et al. | |
| 9,779,013 B2 | 10/2017 | Narayan et al. | |
| 9,857,959 B2 | 1/2018 | Dhawal | |
| 9,864,675 B2 | 1/2018 | Ug | |
| 9,916,414 B2 | 3/2018 | Jeong | |
| 9,990,272 B2 | 6/2018 | Cooper | |
| 9,996,452 B2 | 6/2018 | Cooper et al. | |
| 10,061,685 B1 | 8/2018 | White | |
| 10,073,763 B1* | 9/2018 | Raman | G06F 11/3684 |
| 10,152,479 B1* | 12/2018 | Granstrom | G06F 16/483 |
| 10,383,553 B1 | 8/2019 | Glenn | |
| 10,560,539 B1* | 2/2020 | Loch | H04L 67/2819 |
| 2003/0233600 A1 | 12/2003 | Hartman | |
| 2004/0154001 A1 | 8/2004 | Haghighat et al. | |
| 2006/0179386 A1 | 8/2006 | Pushpavanam | |
| 2008/0172652 A1 | 7/2008 | Davia et al. | |
| 2010/0023928 A1 | 1/2010 | Hentschel et al. | |
| 2010/0100871 A1 | 4/2010 | Celeskey | |
| 2010/0287534 A1 | 11/2010 | Vangala et al. | |
| 2011/0016457 A1 | 1/2011 | Artzi et al. | |
| 2011/0145653 A1 | 6/2011 | Broadfoot | |
| 2012/0191443 A1 | 7/2012 | Amalfitano | |
| 2012/0253728 A1 | 10/2012 | Chamas | |
| 2012/0260132 A1 | 10/2012 | Blue | |
| 2013/0152047 A1 | 6/2013 | Moorthi | |
| 2014/0059081 A1 | 2/2014 | Farchi et al. | |
| 2014/0095933 A1 | 4/2014 | Griesinger | |
| 2014/0372083 A1 | 12/2014 | Hsu et al. | |
| 2015/0094997 A1 | 4/2015 | Ivrii et al. | |
| 2015/0106653 A1 | 4/2015 | Adler et al. | |
| 2016/0378618 A1 | 12/2016 | Cmielowski et al. | |
| 2017/0060734 A1 | 3/2017 | Raz et al. | |
| 2017/0103013 A1 | 4/2017 | Grechanik | |
| 2017/0132119 A1 | 5/2017 | Xu et al. | |
| 2017/0199810 A1 | 7/2017 | Hamilton | |
| 2017/0262361 A1 | 9/2017 | Francis | |
| 2017/0270035 A1 | 9/2017 | Nie | |
| 2018/0024911 A1 | 1/2018 | Kruszewski et al. | |
| 2018/0052725 A1 | 2/2018 | Hannson | |
| 2018/0095867 A1 | 4/2018 | Varadarajan et al. | |
| 2018/0293156 A1 | 10/2018 | Zeng | |
| 2018/0300226 A1 | 10/2018 | Manolios | |
| 2018/0329807 A1 | 11/2018 | Atyam | |
| 2019/0332523 A1 | 10/2019 | Gefen | |
| 2020/0242011 A1 | 7/2020 | Hicks | |
| 2020/0242012 A1 | 7/2020 | Hicks | |
| 2020/0242013 A1 | 7/2020 | Hicks | |

OTHER PUBLICATIONS

Trokielewicz, "Linear Regression Analysis of Template Aging in Iris Biometrics", IEEE, pp. 1-6T (Year: 2015).*

Bromme et al, "A Conceptual Framework for Testing Biometric Algorithms within Operating Systems' Authentication", ACM, pp. 273-280 (Year: 2002).*

Snelick et al, "Multimodal Biometrics: Issues in Design and Testing", ACM, pp. 68-72 (Year: 2003).*

Ratha et al, "A Real-Time Matching System for Large Fingerprint Databases", IEEE, pp. 799-813 (Year: 1996).*

Esmaeili et al, "A Robust and Fast Video Copy Detection System Using Content-Based Fingerprinting", pp. 213-226 (Year: 2011).*

Jain et al, "Fingerprint Matching", IEEE, pp. 36-44 (Year: 2010).*

Shu et al, "Testing Security Properties of Protocol Implementations—a Machine Learning Based Approach", IEEE, pp. 1-8 (Year: 2007).*

Anonymous, "A Method and System for Providing Collaborative Platform as a Service for Aiding Machine Learning Development," IP.com (IPCOM000256095D). Nov. 2, 2018. 5 pages.

Anonymous, "Black Hole Testing—Machine Learning Program Behavior Patterns from Massive Automated Test Results," IP.com (IPCOM000243987D). Nov. 4, 2015. 8 pages.

Anonymously Disclosed "A system and method for setting breakpoints automatically by comparing correct and incorrect runs" IP.corn No. IPCOM000252399D, Publication Date: Jan. 8, 2018, 5 pages.

Anonymously Disclosed "Advanced Interrogative Debugger for data-centric domain", IP.com No. IPCOM000226865D, Publication Date: Apr. 23, 2013, 14 pages.

Anonymously Disclosed "Cognitive, Self-Instrumenting Code on Detection of an Issue" IP.com No. IPCOM000253277D; Publication Date: Mar. 19, 2018; 4 pgs.

Anonymously Disclosed "Method and system to find potential program defect based on run-time variable change analysis", IP.com No. IPCOM000248699D, Publication Date: Dec. 28, 2016, 8 pages.

Anonymously Disclosed "Method for a debugging tool for finding variable value in application stack", IP.com No. IPCOM000209789D, Publication Date: Aug. 15, 2011, 5 pages.

Anonymously Disclosed "Method to enable debugger breakpoint inside statement", IP.com No. IPCOM000206941D, Publication Date: May 13, 2011, 8 pages.

(56) References Cited

OTHER PUBLICATIONS

Anonymously Disclosed "Simple Automated Code Coverage Method for test metrics", IP.com No. IPCOM000201864D, Publication Date: Nov. 29, 2010, 6 pages.
Anonymously Disclosed "Structured enhanced breakpoint chain", IP.com No. IPCOM000244264D, Publication Date: Nov. 27, 2015, 4 pages.
Anonymously Disclosed "System and method for improved regression failure analysis and easier debugging of test failures", IP.com No. IPCOM000209599D, Publication Date: Aug. 10, 2011, 6 pages.
Astigarraga, Tara "IBM Test Overview and Best Practices", IBM, Nov. 2012, pp. 1-53.
Cohen, D. M. et al., "The AETG system: An approach to testing based on combinatorial design." IEEE Transactions on Software Engineering, 23(7), pp. 437-444. Jul. 1997.
Compuware Corporation "Validate Testing Thoroughness and Provide Application Analysis", 2014, 4 pages.
De Souza et al., "Spectrum-based Software Fault Localization: A Survey of Techniques, Advances and Challenges" Dept. of Computer Science—University of Sao Paulo; arXiv:1607.04347v2 [cs_SE]; Nov. 26, 2017, 46 pages.
Devai, Gergely et al., "UML Model Execution via Code Generation" Eotvos Lorand University, Faculty of Informatics, Budapest, Hungary 2017, pp. 9-15.
Hicks et al., "Champion Test Case Generation", U.S. Appl. No. 16/256,949, filed Jan. 24, 2019.
Hicks et al., "Combinatoric Set Completion Through Unique Test Case Generation", U.S. Appl. No. 16/256,394, filed Jan. 24, 2019.
Hicks et al., "Fault Detection and Localization Using Combinatorial Test Design Techniques While Adhering to Archtiectural", U.S. Appl. No. 16/256,391, filed Jan. 24, 2019.
Hicks et al., "Fault Detection and Localization to Generate Failing Test Cases Using Combinatorial Test Design Techniques", U.S. Appl. No. 16/256,388, filed Jan. 24, 2019.
Hicks et al., "Self Healing Software Utilizing Regression Test Fingerprints", U.S. Appl. No. 16/440,833, filed Jun. 13, 2019.
Hicks et al., "Test Space Analysis Across Multiple Combinatoric Models", U.S. Appl. No. 16/256,388, filed Jan. 24, 2019.
Hicks et al., "Associating Attribute Seeds of Regression Test Cases With Breakpoint Value-Based Fingerprints," U.S. Appl. No. 16/440,857, filed Jun. 13, 2019.
Hicks et al., "Breakpoint Value-Based Version Control," U.S. Appl. No. 16/440,800, filed Jun. 13, 2019.
Hicks et al., "Customizable Test Set Selection Using Code Flow Trees," U.S. Appl. No. 16/440,751, filed Jun. 13, 2019.
Hicks et al., "Fault Detection Using Breakpoint Value-Based Fingerprints of Failing Regression Test Cases," U.S. Appl. No. 16/440,810, filed Jun. 13, 2019.
Hicks et al., "Regression Test Fingerprints Based on Breakpoint Values," U.S. Appl. No. 16/440,404, filed Jun. 13, 2019.

IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.
IBM, "InspectioN Testing Using Debugging Capabilities to Allow Combinational Testing", IP.com No. IPCOM000188370D, Electronic Publication Date: Oct. 2, 2009, 3 pages.
IBM, "Tool and Strategy for testing and validating software components at the source code level", IP.com No. IPCOM000180330D, Publication Date: Mar. 6, 2009, 3 pages.
IBM, Method of preventing build failures by searching through levels in a multi-level revision control system IP.com No. IPCOM000179779D, Publication Date: Feb. 25, 2009, 3 pages.
Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.
Kuhn, Rick "Introduction to Combinatorial Testing", NIST, Carnegie-Mellon University, Jun. 7, 2011, 48 pages.
Leon et al., "An empirical evaluation of test case filtering techniques based on exercising complex information flows," Proceedings of the 27th International Conference on Software Engineering, pp. 412-421. ACM, 2005.
Kamalakar, Sunil, "Automatically Generating Tests from Natural Language Descriptions of Software Behavior," Virginia Polytechic Institute and State University, Sep. 23, 2013. 72 pages.
List of IBM Patents or Patent Applications Treated As Related; Date Filed: Jul. 19, 2019, 2 pages.
Mathur et al., "Adaptive Automation: Leveraging Machine Learning to Support Uninterrupted Automated Testing of Software Applications" arXiv.org, Aug. 4, 2015. 6 pages.
Nguyen et al., "Combining model-based and combinatorial testing for effective test case generation," Proceedings of be 2012 International Symposium on Software Testing and Analysis, Jul. 15-20, 2012. pp. 100-110.
Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification ", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.
Yimaz et al., "Moving forward with combinatorial interaction testing", Feb. 2014, 47(2), pp. 37-45.

* cited by examiner

REDUCTION OF TEST INFRASTRUCTURE

RELATED APPLICATIONS

This application which claims the benefits of multiple legally related applications including Application titled "FAULT DETECTION AND LOCALIZATION TO GENERATE FAILING TEST CASES USING COMBINATORIAL TEST DESIGN TECHNIQUES" assigned Ser. No. 16/256,388, filed Jan. 24, 2019; Application titled "FAULT DETECTION AND LOCALIZATION USING COMBINATORIAL TEST DESIGN TECHNIQUES WHILE ADHERING TO ARCHITECTURAL RESTRICTIONS" assigned Ser. No. 16/256,391, filed Jan. 24, 2019; Application titled "COMBINATORIC SET COMPLETION THROUGH UNIQUE TEST CASE GENERATION" assigned Ser. No. 16/256,394, filed Jan. 24, 2019; Application titled "TEST SPACE ANALYSIS ACROSS MULTIPLE COMBINATORIC MODELS" assigned Ser. No. 16/256,179, filed Jan. 24, 2019; Application titled "CHAMPION TESTCASE GENERATION" assigned Ser. No. 16/256,949, filed Jan. 24, 2019; Application titled "REGRESSION TEST FINGERPRINTS BASED ON BREAKPOINT VALUES," assigned Ser. No. 16/440,404, filed Jun. 13, 2019; Application titled "SELF HEALING SOFTWARE UTILIZING REGRESSION TEST FINGERPRINTS," not yet filed; Application titled "CUSTOMIZABLE TEST SET SELECTION USING CODE FLOW TREES," not yet filed; Application titled "BREAKPOINT VALUE-BASED VERSION CONTROL," not yet filed; Application titled "FAULT DETECTION USING BREAKPOINT VALUE-BASED FINGERPRINTS OF FAILING REGRESSION TEST CASES," not yet filed; and Application titled "ASSOCIATING ATTRIBUTE SEEDS OF REGRESSION TEST CASES WITH BREAKPOINT VALUE-BASED FINGERPRINTS," not yet filed, with all the benefits accruing therefrom, the contents of which in its entirety are herein incorporated by reference.

BACKGROUND

The present invention relates to testing of a computer program and, more specifically, the reduction of test case infrastructure.

Computerized devices control almost every aspect of our life-from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous.

Coverage tools for checking software provide a measure of how well the software being evaluated has been exercised during testing and thereby give a level of assurance that the software is of high quality. There are a number of types of coverage known in the art, such as statement coverage, line coverage, condition coverage, path coverage, method coverage, and the like. One additional coverage method is functional coverage. Functional coverage is designed to measure amount, portion or a similar metric of tests that examined predetermined functional behaviors. Once functional coverage is measured, quality assurance (QA) personnel may design additional tests to examine untested behaviors.

However, test infrastructure can become incredibly expensive and cost per test cycle will increase without continuous optimization of products, tests, and environments. As more tests are added, more test suites are run, and the complexity of the supporting services increases so will the cost of each test cycle. Test environments, test dependencies, and test suites need to be managed with the same rigor as the product being shipped. What is needed is a method enabling efficient reduction of test infrastructure.

SUMMARY

Embodiments of the present invention are directed to a computer-implemented method for reducing test infrastructure. A non-limiting example of the computer-implemented method includes generating a first plurality of fingerprints for a first plurality of test cases. Each of the first plurality of fingerprints is associated with one of the first plurality of test cases. Each of the first plurality of fingerprints uniquely identifies a specific code path covered by a corresponding test case. The first plurality of test cases includes a plurality of preexisting test cases for a System Under Test (SUT). A second plurality of test cases is generated based on a functional coverage model of the SUT. The functional coverage model includes a plurality of attributes. A second plurality of fingerprints is generated for the second plurality of test cases. Each of the second plurality of fingerprints is associated with one of the second plurality of test cases. The first plurality of fingerprints is compared to the second plurality of fingerprints to identify one or more matching fingerprints. One or more test cases is identified within the first plurality of test cases. The identified test cases are associated with the one or more matching fingerprints.

Embodiments of the present invention are directed to a system for reducing test infrastructure. A non-limiting example of the system includes a memory having computer-readable instructions and one or more processors for executing the computer-readable instructions. The computer-readable instructions include instructions for generating a first plurality of fingerprints for a first plurality of test cases. Each of the first plurality of fingerprints is associated with one of the first plurality of test cases. Each of the first plurality of fingerprints uniquely identifies a specific code path covered by a corresponding test case. The first plurality of test cases includes a plurality of preexisting test cases for a System Under Test (SUT). A second plurality of test cases is generated based on a functional coverage model of the SUT. The functional coverage model includes a plurality of attributes. A second plurality of fingerprints is generated for the second plurality of test cases. Each of the second plurality of fingerprints is associated with one of the second plurality of test cases. The first plurality of fingerprints is compared to the second plurality of fingerprints to identify one or more matching fingerprints. One or more test cases is identified within the first plurality of test cases. The identified test cases are associated with the one or more matching fingerprints.

Embodiments of the invention are directed to a computer-program product for reducing test infrastructure, the computer-program product including a computer-readable storage medium having program instructions embodied therewith. The program instructions are executable by a processor to cause the processor to perform a method. A non-limiting example of the method includes generating a first plurality of fingerprints for a first plurality of test cases. Each of the first plurality of fingerprints is associated with one of the first plurality of test cases. Each of the first plurality of fingerprints uniquely identifies a specific code path covered by a corresponding test case. The first plurality of test cases includes a plurality of preexisting test cases for a System Under Test (SUT). A second plurality of test cases is generated based on a functional coverage model of the SUT. The functional coverage model includes a plurality of attributes. A second plurality of fingerprints is generated for the second plurality of test cases. Each of the second plurality of fingerprints is associated with one of the second plurality of test cases. The first plurality of fingerprints is compared to the second plurality of fingerprints to identify one or more matching fingerprints. One or more test cases is identified within the first plurality of test cases. The identified test cases are associated with the one or more matching fingerprints.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
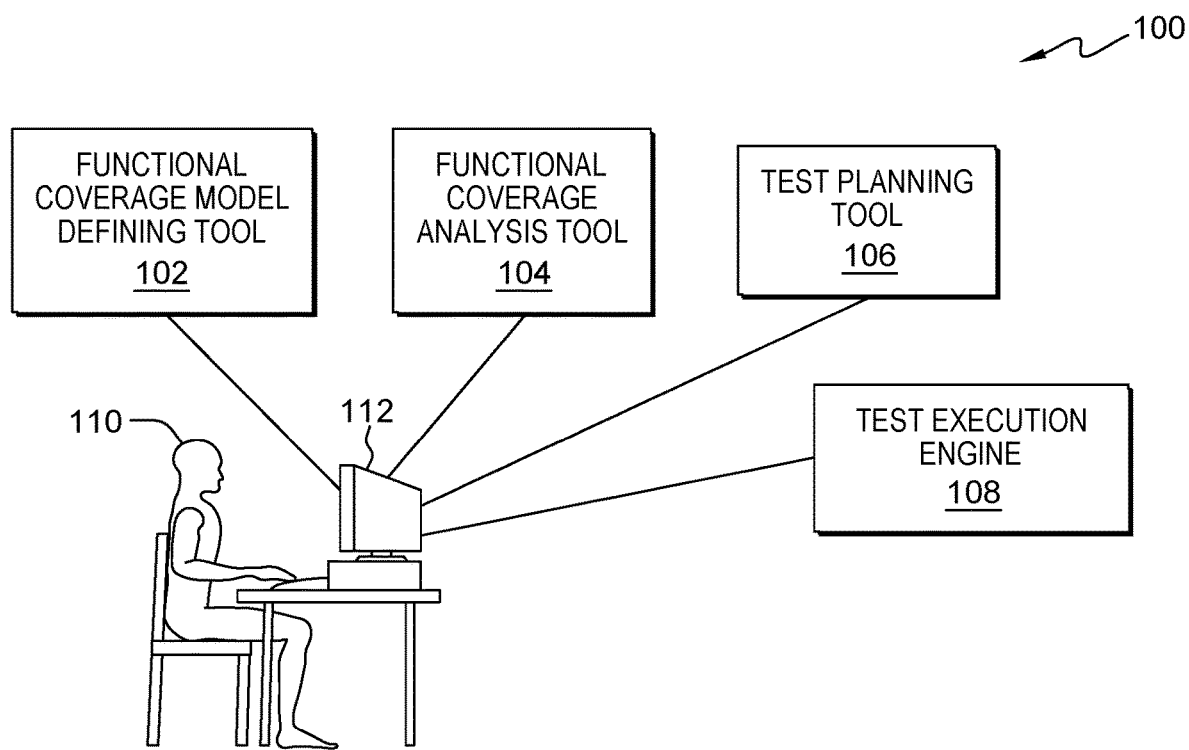
FIG. 1 shows a schematic illustration of a computerized environment, in accordance with embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

A functional coverage is measured with respect to a functional coverage model. The functional coverage model defines functional attributes. The functional attributes may be any attribute of the SUT, such as for example a type of web browser being used, an underlying Operating System, a number of threads operating, whether the output was printed. The cross-product of the different combinations of the attribute values defines a functional coverage test-space. The test-space comprises a set of coverage tasks, each representing functional requirements to be tested: one requirement per functional attribute and the requirement is that the functional attribute will exhibit the behavior of the value of the coverage task. The coverage task may be seen as a tuple of one value per attribute. In a functional coverage model in which there are three functional attributes, one having three possible values, the second having two possible values, and the third having ten possible values, the cross-product test-space comprises sixty (60) coverage tasks.

One challenge has been that a large test suite can contain a large number of conditions (e.g., the number of conditions can grow with the number of iterative elements in the input) many of which lead to combinatorial explosion in the number of execution paths. Embodiments of the present invention enable test planning and redundant test identification based on a plurality of fingerprints associated with various execution code paths. More specifically, various embodiments provide a regression test fingerprint that uniquely identifies a code path traversed during execution of a regression test. That is, certain example embodiments relate to breakpoint value assignment algorithms that generate a unique regression test fingerprint that contains information from which the code path taken by the regression test can be reconstructed including which breakpoints are encountered during execution of the regression test, a number of times each such breakpoint is encountered, and an order in which breakpoints are encountered.

In some exemplary embodiments, test planning may be performed by utilizing Combinatorial Test Design (CTD). CTD may be performed with respect to an interaction requirement, such as a pair-wise interaction or n-tuple interaction. The test plan may provide for sufficient coverage tasks that would assure that the interaction requirement is fulfilled.

In some exemplary embodiments, test planning is based on a modeling of the test space using a functional coverage model. The test space can represent inputs, scenarios, configurations, the application's internal state, or any other aspect that might need to be tested. The functional coverage model may include a set of functional attributes.

With respect to test planning, a test-space may define potential tests that may be executed on the SUT. A test can be associated with exactly one potential test, as opposed to coverage tasks. In some exemplary embodiments, several different tests may hold the same potential test.

In some exemplary embodiments, the motivation for the approach of CTD is that most bugs depend on the interaction between a small number of functional attributes. CTD algorithms may also deal with scalability issues. The CTD algorithms may assume that the combinations space is too large to be represented explicitly, and they use various techniques to try to generate an optimized test plan without explicitly enumerating all possible combinations. Examples of such algorithms may be a reduction to the orthogonal arrays or covering arrays problems. Those techniques are limited in the type of restrictions they allow on the value combinations, or in the type of requested interaction level, and still hit scalability issues as the number of model variables increases.

Despite these reduction efforts, once the SUT has been implemented, new features are typically requested and added as users exercise the functionality of the system. New test cases are created as the new features are added. Sets of test cases are, therefore, maintained for a system to ensure that previous functionality still works, that new functionality works and that the new functionality does not adversely affect the old functionality. These test case sets are termed regression test cases, and the activity of testing a system to ensure conformance with legacy requirements is typically termed regression testing.

Generally, at least some of the regression test case sets are created and maintained manually over the life of the system. They are manually selected based on the number of tests that can be run in an allotted amount of time, tests that exercise the most important features of the system, and tests that have historically exposed the greatest number of problems in the system when introducing new features. A drawback of conventional regression testing is that some of the additional test cases repeat test actions that are covered by other test cases in the regression test case set. This is the penalty associated with the incremental addition of test cases. For a large, complex project, using the manual iterative method of adding test cases to the regression test case set can result in a large amount of duplicate test actions.

Without the ability to automatically regenerate the test set in response to changes made to the requirements, the testing effort proceeds inefficiently. Initially, it is possible to manually select a close to the optimal set of test cases from a small requirements model. The requirements model, however, grows as new features and capabilities are added to the system. Once the requirement model is large, manually selecting a close to an optimal set of test cases is impossible. In one known method, the original set of test cases will simply be augmented with test cases that exercise the new parts of the requirements model. Over time, using this approach, there will be extensive redundancy between the test cases. The same scenarios or scenario fragments are included in a large proportion of the test cases. Other scenarios and scenario fragments will be ignored entirely and will not be included in any test case. Overall there will be a large number of test cases, far more than necessary for coverage, and the coverage achieved by this large test set will be poor. Thus, there is a need to reduce this redundancy by removing test cases that cover identical execution paths.

Referring now to FIG. 1, showing a schematic illustration of a computerized environment, in accordance with embodiments of the present invention. A computerized environment 100 may comprise one or more computerized tools.

In some exemplary embodiments, a user 110, such as a developer, a QA staff member, a tester, a designer, a verification engineer or the like, may interact with the computerized environment 100. The user 110 may utilize a Man-Machine Interface (MMI) 112 such as a terminal, a display, a keyboard, an input device or the like.

In some exemplary embodiments, a functional coverage model defining tool 102 may be utilized to define the functional coverage model. In some exemplary embodiments, the user 110 may define the functional attributes. In some exemplary embodiments, a similar tool may be utilized to define a test-space. In some exemplary embodiments, the functional coverage model may be adapted to be utilized as a test model.

In some exemplary embodiments, a test execution engine 108 may be utilized to test the SUT. It will be noted that the SUT may be hardware, firmware, software, combination thereof or any other type of computerized device. The test execution engine 108 may be a simulation-based verification tool, a test-generation platform, or the like. The test execution engine 108 may be operatively coupled to a test planning tool 106 and configured to perform testing in accordance with the test plan. In some exemplary embodiments, the test planning tool 106 may provide the tests for the test execution engine 108 to perform. It will be noted that dynamic verification is a broader concept than testing the SUT, and it further includes test planning, coverage analysis and the like. The test execution engine 108 provides only one aspect of the entire scope of operations that may be performed during dynamic verification and should not be used to construe the term "dynamic verification" narrowly.

In some exemplary embodiments, a functional coverage analysis tool 104 may be configured to measure functional coverage based on the dynamic verification performed by the test execution engine 108. The functional coverage analysis tool 104 may provide a coverage measurement, such as a portion of the coverage test-space or of the defined test plan, indicative of coverage tasks that were covered during dynamic verification performed by the test execution engine 108. The user 110 may review the coverage measurement and/or the list of covered tasks.

In some exemplary embodiments, a test planning tool 106 may define a test plan to be covered. In some exemplary embodiments, the test plan may be a set of coverage tasks to be covered. In some exemplary embodiments, the test plan tool 106 may provide tests that are likely to cover the test plan, such as based on a test benchmark stored in a datastore which comprises tests that are known/estimated to cover specific functional aspects. As another example, the test plan tool 106 may be configured to generate tests so as to cover coverage tasks. The user 110 may review the test plan, the selected test or the like. In some exemplary embodiments, the user 110 may provide parameters for the test planning tool 106 to use in determining the objective of the test plan, such as a desired interaction level. Embodiments of the present invention enables the elimination of any redundancy in the generated tests.

While the example system in FIG. 1 has been described with specific components including the functional coverage model defining tool 102, functional coverage analysis tool 104, test planning tool 106 and the test execution engine 108, embodiments are not limited to these components or system configurations and can be implemented with other system configuration employing fewer or additional components.

Figure 2:
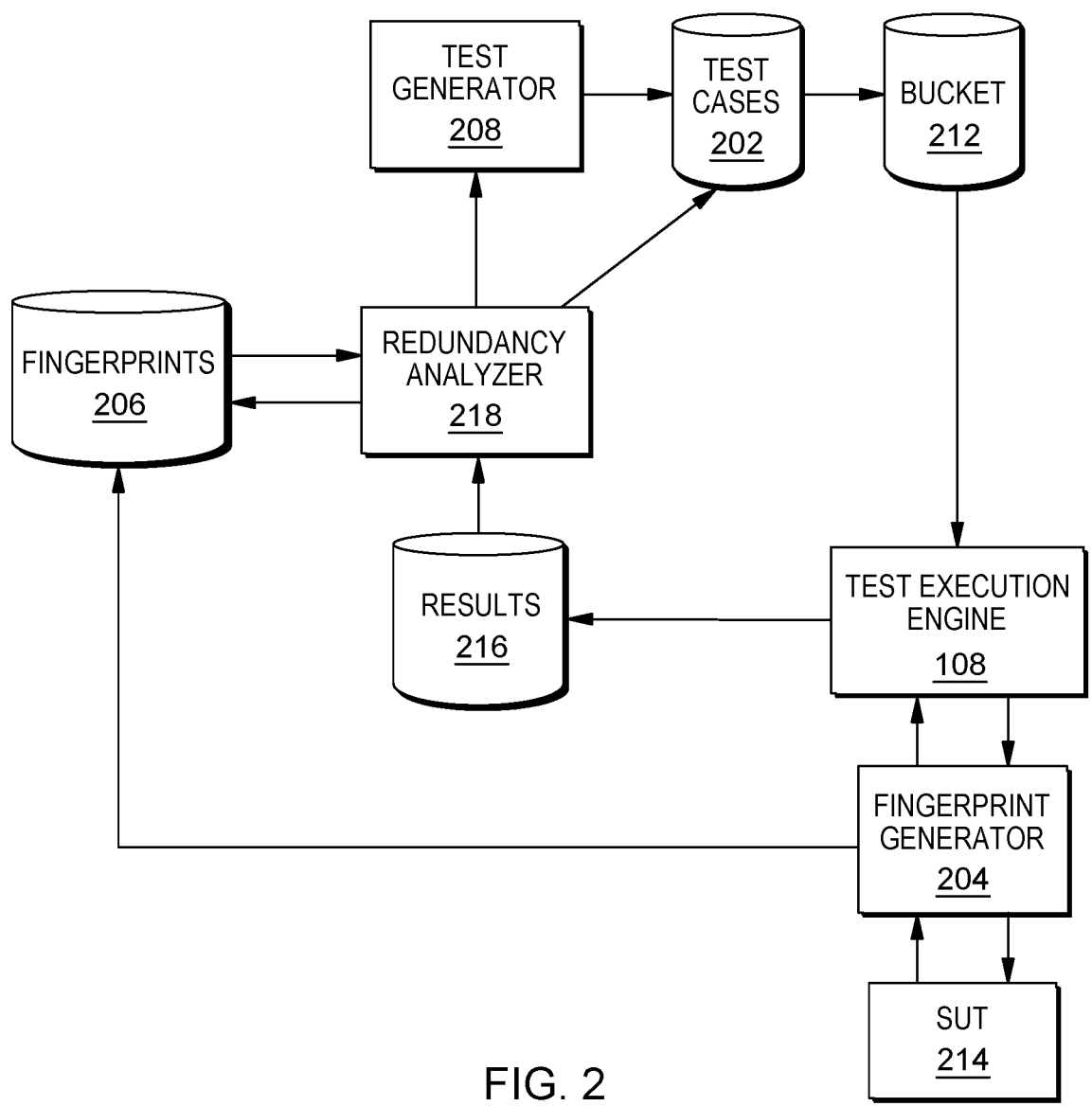
FIG. 2 is a collaboration diagram representing the roles of different software modules that may be used to implement the disclosed solution, according to an embodiment of the invention.

FIG. 2 is a collaboration diagram representing the roles of different software modules within the infrastructure that may be used to implement the disclosed solution, according to an embodiment of the invention. More specifically, the infrastructure includes a test generator 208. The test generator 208 accesses a test infrastructure, such as a repository of test cases 202, which stores suites of test cases available to verify the correctness of the SUT 214. Each test case specifies an input to be applied to the SUT 214 and the expected response that should be returned in response to this input (to indicate its correct operation). Typically, the test cases are organized into sets (test suites), for example, each test suite for a different component of the SUT 214.

The test generator 208 creates an execution bucket for each run of the test on the SUT 214. The bucket specifies the operations to be performed for running the desired test cases in a machine-readable language (such as XML-based). Particularly, in the case of a complete test all the available test cases are executed on each component of the SUT 214; conversely, in the case of a regression test, the execution is limited to a subset of selected test cases. The bucket so obtained can be saved into a file.

A test execution engine 108 controls the execution of the bucket read from the file. For each test case of the bucket, this involves the application of the corresponding input to the SUT 214. In response thereto, the SUT 214 returns a corresponding output to the test execution engine 108. The test execution engine 108 determines the result of the test case by comparing its output with the corresponding expected response (extracted from the file, for example). The result of the test case (i.e., positive when the two values match and negative otherwise) is saved into a log. For example, this may be achieved by means of a standard Test Tracking Tool (TTT), such as the "Rational Test Manager" by IBM Corporation. The results of the (current) run of the test are available in the log for their analysis.

As noted above, for a large, complex SUT 214 the test case infrastructure 202 can contain a large amount of duplicate test actions/test cases. In accordance with certain embodiments of the present invention, one technique developed to address these challenges incorporates the use of a fingerprint repository 206 with a store of information including a set of fingerprints that correspond to a plurality of regression tests stored in the test repository 202. In one embodiment, the fingerprints are generated by a fingerprint generator 204. For instance, the fingerprint repository 206 can include fingerprints of most, if not all, of the tests stored in the test repository 202 and a reference to where copies of the test are located throughout the test infrastructure, similar to an index in a book. Each fingerprint uniquely identifies a specific code path covered by a corresponding test case. In this manner, the system can identify fingerprints (and corresponding tests) that are duplicates.

According to embodiments of the present invention, processing of the results 216 of the regression tests generated by the test generator 208 and executed by the test execution engine 108 may include determination of a code path traversed during execution of each generated regression test and generation of a fingerprint for each executed regression test based at least in part on the code path. In one embodiment, these steps may be performed by the fingerprint generator 204.

A redundancy analyzer 218 compares fingerprints corresponding to all test cases generated by the test generator 208 to a plurality of fingerprints stored in the fingerprint repository 206. The redundancy analyzer 218 provides a list of the regression test cases generated by the test generator 208 that have matching fingerprints with one or more fingerprints stored in the fingerprint repository 206. This information is used to select and discard the duplicate test cases from the test repository 202 (as described below).

Figure 3:
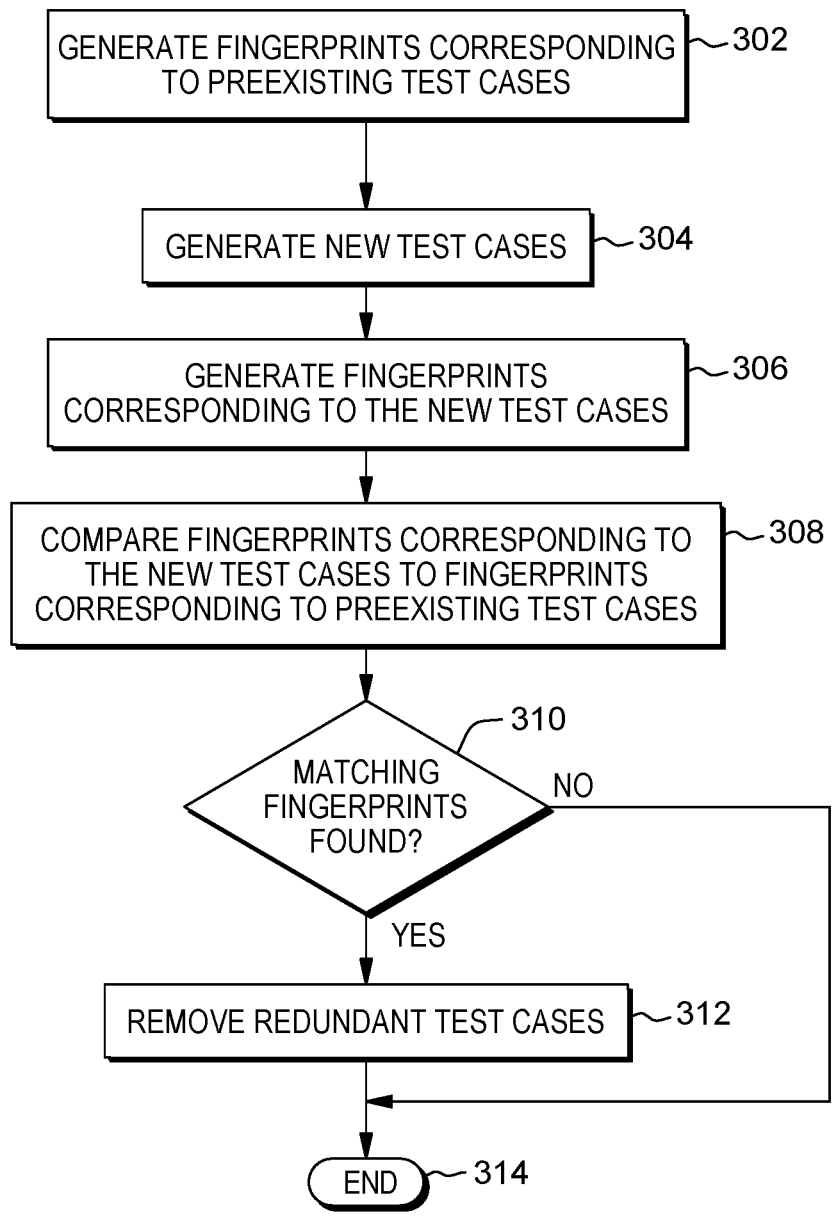
FIG. 3 shows a flowchart of a method for reducing test infrastructure, in accordance with embodiments of the present invention.

FIG. 3 shows a flowchart of a method for reducing test infrastructure, in accordance with embodiments of the present invention. It should be noted that each operation of the method depicted in FIG. 3 may be performed by one or more of the program modules or the like depicted in FIG. 1, FIG. 2 or FIG. 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

At block 302, the fingerprint generator 204 may generate a plurality of fingerprints for a plurality of tests that had been run on the SUT 214. The fingerprint generator 204 may retrieve the preexisting regression tests from one or more datastores, such as test repository 202. In example embodiments, these preexisting regression tests may have been executed on source code, which may also be retrieved from the test repository 202. In example embodiments, inputs to the source code to be tested may be modeled as a collection of attribute-value pairs. As such, in certain example embodiments, each regression test case may be a test case designed to test the operation of the source code of the SUT 214 with respect to a particular combination of attribute values. In example embodiments, the fingerprint generator 204 may generate fingerprints for each executed regression test based at least in part on the code path traversed by the source code covered by the corresponding test case.

At block 304, the test generator 208 may generate one or more tests (e.g., a set of regression tests) to run on the SUT 214. In one embodiment, the test generator 208 may utilize CTD to determine a set of tests to be executed. In one embodiment, the test generator 208 may be given a description of a test space in the form of variables, their respective values, and possibly restrictions on the values combinations. In one exemplary embodiment, the test generator 208 may select a subset of the possible tests that ensures coverage of all valid combinations of every two attributes (or every three, or four, etc.). Many tools and algorithms exist for CTD as is disclosed in Grindal, M., Offutt, J., Andler, S. F. "Combination testing strategies: a survey". Softw. Test, Verif. Reliab 15(3), 167-199 (2005), and the disclosed embodiment may utilize any of one of them.

In one embodiment, the test generation may be performed by selecting a subset of the tests that would maintain 100% n-wise coverage with respect to the tested test space, and therefore maintaining the n-wise coverage metric with respect to the valid test space. In some exemplary embodiments, at block 304, the functional coverage analysis tool 104 may be operative to determine a subset of the possible combinations of values. The subset of the possible combinations of values is with respect to the covered test space defined by the functional coverage model determined by the functional coverage model defining tool 102. The most common criterion for test selection is code coverage, i.e., select a subset of the tests that cover code that has recently changed, for example.

According to an embodiment of the present invention, at block 306, after the test execution engine 108 executes the generated plurality of tests, the fingerprint generator 204 generates fingerprints corresponding to the executed plurality of tests. Each fingerprint uniquely identifies the code path traversed during execution of a corresponding regression test. In some exemplary embodiments, the fingerprint generation algorithm employed by the fingerprint generator 204 generates a fingerprint that identifies not only the breakpoints encountered during traversal of a code path and the number of times each such breakpoint is encountered, but also the order in which the encounters occur. Thus, if execution of two different regression tests results in code paths that encounter the same breakpoints the same number of times but in different orders, the respective fingerprint generated for each regression test will uniquely identify the particular order in which breakpoint encounters occur for that regression test.

At block 308, the redundancy analyzer 218 compares the fingerprints generated at block 306 with a plurality of fingerprints stored in the fingerprints repository 206. The redundancy analyzer 218 attempts to find exact matches. As a non-limiting example, if the fingerprint generator 204 employs a string-based algorithm and generates the fingerprint <ABABCDCDE> for a corresponding regression test, at block 308 the redundancy analyzer 218 determines whether there are any <ABABCDCDE> fingerprints in the fingerprints repository 206. It should be noted, each element of the string <ABABCDCDE> identifies a corresponding breakpoint that is encountered; the number of times that the same element appears in the string indicates the number of times the corresponding breakpoint is encountered; and the ordering of the elements in the string indicates the order in which the breakpoints are encountered. Once the redundancy analyzer 218 identifies matching fingerprints, it also identifies corresponding test cases stored in the test repository 202 based on the identified fingerprint information.

If the redundancy analyzer 218 finds no matching fingerprints (decision block 310, No branch), the disclosed method ends at block 314. Responsive to finding one or more matching fingerprints (decision block 310, Yes branch), at block 312, the redundancy analyzer 218 removes the redundant test cases associated with the matching fingerprint from the test repository 202. In other words, if one or more of older test case is associated with a fingerprint that matches the fingerprint of one of the newer generated CTD tests, then the older case can be removed from the test repository 202. This reduction of redundant test cases advantageously alleviates maintenance requirements on the test infrastructure as older test cases are gradually cycled out.

Figure 4:
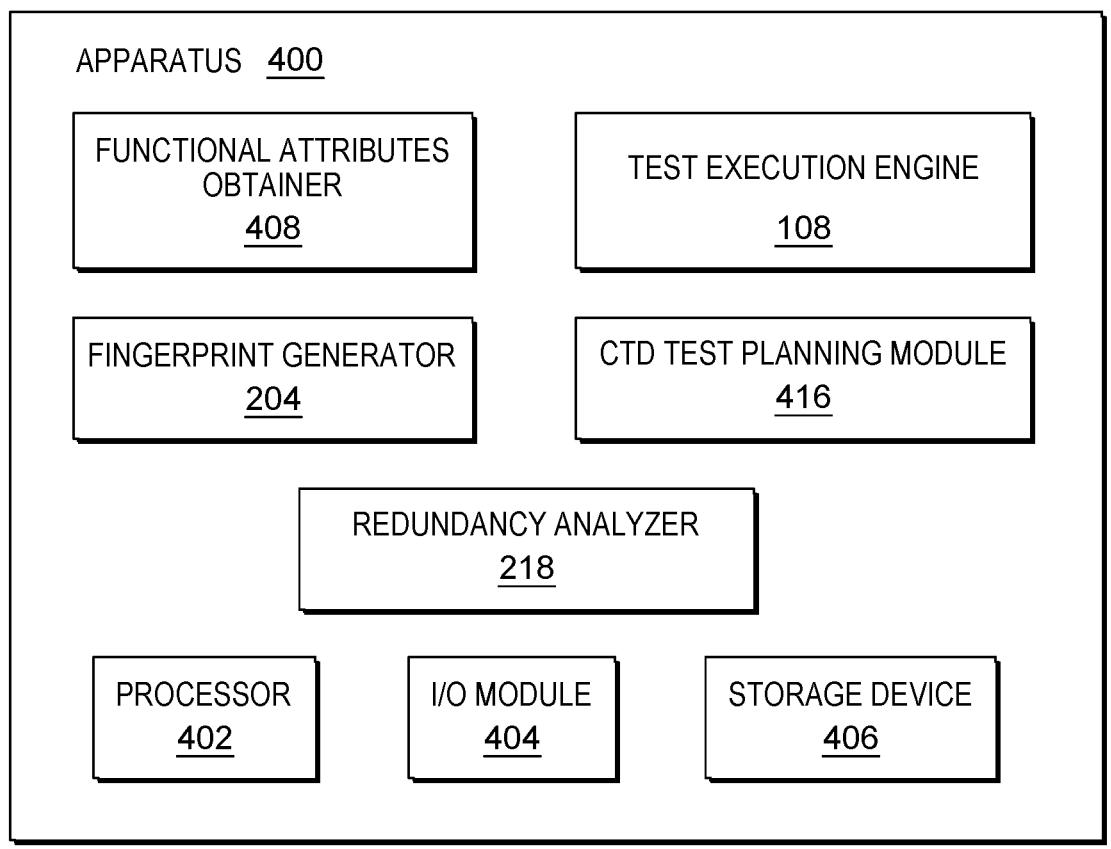
FIG. 4 shows a block diagram of components of an apparatus, in accordance with embodiments of the present invention.

Referring now to FIG. 4 showing a block diagram of components of an apparatus, in accordance with embodiments of the present invention. Apparatus 400 may be configured to perform the method disclosed in FIG. 3. The apparatus 400 may provide the functionalities of the functional coverage model defining tool 102, the functional coverage analysis tool 104, the test execution engine 108 or the like. A functional attributes obtainer 408 may be configured to obtain the functional attributes.

A test planning module may be configured to determine a test plan. In some exemplary embodiments, the test planning module may be a CTD test planning module 416 configured to determine a test plan in accordance with CTD. The test plan may be designed to cover all interactions of a predetermined number of functional attributes, such as two, three, four, or the like. The CTD test planning module 416 may provide a test plan to the test execution engine 108.

The test execution engine 108 may be configured to execute generated tests (e.g., generated regression tests) on the SUT 214. For instance, the test execution engine 108 may execute the regression test on the source code of the SUT 214. The test execution engine 108 may be configured to provide functionalities such as described with respect to step 306 of FIG. 3.

A fingerprint generator 204 may be configured to generate fingerprints uniquely identifying the code path traversed during execution of a corresponding regression test. The fingerprint generator 204 may generate the fingerprints in a similar manner to that described with respect to steps 302 and 306 of FIG. 3.

A redundancy analyzer 218 may be configured to identify redundant test cases within the test infrastructure. In one embodiment, the redundancy analyzer 218 may employ fingerprint comparison to remove redundant test cases from the test infrastructure in a manner disclosed with respect to steps 308-312 of FIG. 3.

In some exemplary embodiments, the apparatus 400 may comprise a processor 402. The processor 402 may be a Central Processing Unit (CPU), a microprocessor, an electronic circuit, an Integrated Circuit (IC) or the like. The processor 402 may be utilized to perform computations required by the apparatus 400 or any of its subcomponents.

In some exemplary embodiments of the present invention, the apparatus 400 may comprise an Input/Output (I/O) module 404. The I/O module 404 may be utilized to provide an output to and receive input from the user 110. The I/O module 404 may provide for an interface to external modules, tools, devices, or the like. The I/O module 404 may be utilized to obtain information from the user, such as for the functional attributes obtainer 408. The I/O module 404 may obtain from a user an objective of a test suite, a coverage task to examine or the like. In some exemplary embodiments, the I/O module 404 may provide an output to the user 110 such as a test plan, a list of redundant test cases or the like. In some exemplary embodiments, the I/O module 404 may be configured to provide the test execution engine 108 with the test plan to be performed.

In some exemplary embodiments, the apparatus 400 may comprise a storage device 406. The storage device 406 may be a hard disk drive, a Flash disk, a Random-Access Memory (RAM), a memory chip, or the like. In some exemplary embodiments, the storage device 406 may retain program code operative to cause the processor 402 to perform acts associated with any of the subcomponents of the apparatus 400. In some exemplary embodiments, the storage device 406 may retain the test repository 202 and/or fingerprint repository 206 utilized by the apparatus.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The terminology used herein is for the purpose of describing particular embodiments only and is not intended to be limiting of the invention. As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for reducing test case infrastructure, the method comprising:
    generating a first plurality of fingerprints for a first plurality of test cases to test a system under test (SUT), wherein each of the first plurality of fingerprints is associated with one of the first plurality of test cases, wherein each of the first plurality of fingerprints uniquely identifies a specific code path in the SUT covered by a corresponding test case by cumulatively indicating a collection of breakpoints in the specific code path in the SUT, and wherein the first plurality of test cases comprises a plurality of preexisting test cases for a the SUT;
    generating a second plurality of test cases based on a functional coverage model of the SUT, wherein the functional coverage model comprises a plurality of attributes;
    generating a second plurality of fingerprints for the second plurality of test cases, wherein each of the second plurality of fingerprints is associated with one of the second plurality of test cases;
    comparing the first plurality of fingerprints to the second plurality of fingerprints to identify one or more matching fingerprints;
    identifying one or more test cases within the first plurality of test cases, the one or more test cases are associated with the one or more matching fingerprints;
    reducing redundant test cases by replacing the one or more test cases that are identified from the first plurality of test cases with the second plurality of test cases; and
    testing the SUT by executing the first plurality of test cases.

2. The method of claim 1, wherein the second plurality of test cases is generated utilizing Combinatorial Test Design (CTD).

3. The method of claim 1, wherein the one or more matching fingerprints comprise identical fingerprints.

4. The method of claim 1, wherein the first plurality of fingerprints and the second plurality of fingerprints are generated based on a plurality of breakpoints within a specific code path covered by a corresponding test case.

5. The method of claim 1, wherein each of the plurality of attributes has a set of possible values and wherein the functional coverage model defines possible combinations of values of the plurality of attributes as covered by the second plurality of test cases.

6. The method of claim 5, wherein the second plurality of test cases comprises a plurality of regression test cases and wherein each of the second plurality of test cases comprises a test case designed to test operation of a source code of the SUT with respect to a particular combination of attribute values.

7. A system for reducing test case infrastructure, the system comprising:
    a memory having computer-readable instructions; and
    one or more processors for executing the computer-readable instructions, the computer-readable instructions comprising:
    instructions for generating a first plurality of fingerprints for a first plurality of test cases to test a system under test (SUT), wherein each of the first plurality of fingerprints is associated with one of the first plurality of test cases, wherein each of the first plurality of fingerprints uniquely identifies a specific code path in the SUT covered by a corresponding test case by cumulatively indicating a collection of breakpoints in the specific code path in the SUT, and wherein the first plurality of test cases comprises a plurality of preexisting test cases for the SUT;
    instructions for generating a second plurality of test cases based on a functional coverage model of the SUT, wherein the functional coverage model comprises a plurality of attributes;
    instructions for generating a second plurality of fingerprints for the second plurality of test cases, wherein each of the second plurality of fingerprints is associated with one of the second plurality of test cases;
    instructions for comparing the first plurality of fingerprints to the second plurality of fingerprints to identify one or more matching fingerprints;
    instructions for analyzing complexity of the generated plurality of trees based on user-specified criteria;
    instructions for reducing redundant test cases by replacing the one or more test cases that are identified from the first plurality of test cases with the second plurality of test cases; and
    instructions for testing the SUT by executing the first plurality of test cases.

8. The system of claim 7, wherein the second plurality of test cases is generated utilizing Combinatorial Test Design (CTD).

9. The system of claim 7, wherein the one or more matching fingerprints comprise identical fingerprints.

10. The system of claim 7, wherein the instructions for generating the first plurality of fingerprints and the instructions for generating the second plurality of fingerprints comprise instructions to generate fingerprints based on a plurality of breakpoints within a specific code path covered by a corresponding test case.

11. The system of claim 7, wherein each of the plurality of attributes has a set of possible values and wherein the functional coverage model defines possible combinations of values of the plurality of attributes as covered by the second plurality of test cases.

12. The system of claim 11, wherein the second plurality of test cases comprises a plurality of regression test cases and wherein each of the second plurality of test cases comprises a test case designed to test operation of a source code of the SUT with respect to a particular combination of attribute values.

13. A computer-program product for reducing test case infrastructure, the computer-program product comprising a computer-readable storage medium having program instructions embodied therewith, the program instructions executable by a processor to cause the processor to perform a method comprising:
    generating a first plurality of fingerprints for a first plurality of test cases to test a system under test (SUT), wherein each of the first plurality of fingerprints is associated with one of the first plurality of test cases, wherein each of the first plurality of fingerprints uniquely identifies a specific code path in the SUT covered by a corresponding test case by cumulatively indicating a collection of breakpoints in the specific code path in the SUT, and wherein the first plurality of test cases comprises a plurality of preexisting test cases for a the SUT;

generating a second plurality of test cases based on a functional coverage model of the SUT, wherein the functional coverage model comprises a plurality of attributes;

generating a second plurality of fingerprints for the second plurality of test cases, wherein each of the second plurality of fingerprints is associated with one of the second plurality of test cases;

comparing the first plurality of fingerprints to the second plurality of fingerprints to identify one or more matching fingerprints;

identifying one or more test cases within the first plurality of test cases associated with the one or more matching fingerprints;

reducing redundant test cases by replacing the one or more test cases that are identified from the first plurality of test cases with the second plurality of test cases; and testing the SUT by executing the first plurality of test cases.

14. The computer-program product of claim 13, wherein the second plurality of test cases is generated utilizing Combinatorial Test Design (CTD).

15. The computer-program product of claim 13, wherein each of the plurality of attributes has a set of possible values and wherein the functional coverage model defines possible combinations of values of the plurality of attributes as covered by the second plurality of test cases.

16. The computer-program product of claim 13, wherein the one or more matching fingerprints comprise identical fingerprints.

17. The computer-program product of claim 13, wherein the first plurality of fingerprints and the second plurality of fingerprints are generated based on a plurality of breakpoints within a specific code path covered by a corresponding test case.

* * * * *